(12) United States Patent
Daniels et al.

(10) Patent No.: US 8,794,475 B1
(45) Date of Patent: Aug. 5, 2014

(54) FLOATABLE COLLECTION RECEPTACLE

(76) Inventors: Ian E. Daniels, Gainesville, FL (US);
Eric Daniels, Gainesville, FL (US);
Gwendolyn L. Daniels, Gainesville, FL (US)

( * ) Notice: Subject to any disclaimer, the term of this patent is extended or adjusted under 35 U.S.C. 154(b) by 883 days.

(21) Appl. No.: 12/830,811

(22) Filed: Jul. 6, 2010

(51) Int. Cl.
*B65D 25/00* (2006.01)
*A01K 97/00* (2006.01)

(52) U.S. Cl.
USPC .................. 220/560; 43/54.1; 43/105; 43/12

(58) Field of Classification Search
CPC ........ B65D 85/50; B65D 77/10; A01K 97/00;
A01K 97/02; A01K 97/04; A01K 71/00;
A01K 74/00; A01K 79/00; A01K 69/00;
A01K 69/02; A01K 69/04; A01K 69/06;
A01K 69/08; A01K 69/10
USPC ............. 43/55, 54.1, 56, 7, 105, 12; 220/560;
383/98, 99, 34
See application file for complete search history.

(56) References Cited

U.S. PATENT DOCUMENTS

| | | | | |
|---|---|---|---|---|
| 466,814 | A | * | 1/1892 | Weltmer ............................ 383/6 |
| 2,469,978 | A | * | 5/1949 | Mrozinski .................. 242/379.2 |
| 3,478,463 | A | * | 11/1969 | Ruter ................................ 43/55 |
| 4,143,480 | A | | 3/1979 | Bott |
| 4,428,319 | A | | 1/1984 | Henning et al. |
| 4,890,413 | A | * | 1/1990 | Nelson et al. ...................... 43/55 |
| 4,903,429 | A | * | 2/1990 | Tetenes ......................... 43/44.99 |
| 4,982,697 | A | | 1/1991 | Neff |
| 6,065,239 | A | | 5/2000 | Thomas et al. |
| 6,073,382 | A | | 6/2000 | Willener |
| 7,040,838 | B2 | | 5/2006 | Allard et al. |
| 2007/0053616 | A1 | * | 3/2007 | Plouff .............................. 383/22 |

OTHER PUBLICATIONS

Surface Marker Buoy webpage: http://en.wikipedia.org/wiki/Surface_marker_buoy, obtained Mar. 16, 2010, pp. 1-4.
Daniels, Ian E., "Floater Toter", report for Invention Sensations! Fair, disclosed on Sep. 17, 2009, Queen of Peace Catholic Academy, Gainesville, FL, USA.
Brownie's Yacht Diver webpage: www.yachtdiver.com Variable Speed Diving Systems, obtained May 2, 2011, pp. 1-2.

* cited by examiner

*Primary Examiner* — Andrew Perreault
(74) *Attorney, Agent, or Firm* — Saliwanchik, Lloyd & Eisenschenk

(57) ABSTRACT

An aquatic collection receptacle that floats while remaining attached to a diver. Embodiments can include floatable rim with an attached underwater container. Further embodiments include an escape barrier or crossing lines over the mouth of the receptacle to prevent loss of contents while floating. A lanyard connects the receptacle to a diver, allowing it to float and be pulled along by the diver. If pulled beneath the water surface by the lanyard, the floatable rim can fold or otherwise close over the mouth of the container to prevent loss of contents. Alternative embodiments include a breakaway lanyard to ensure safety of the diver.

15 Claims, 5 Drawing Sheets

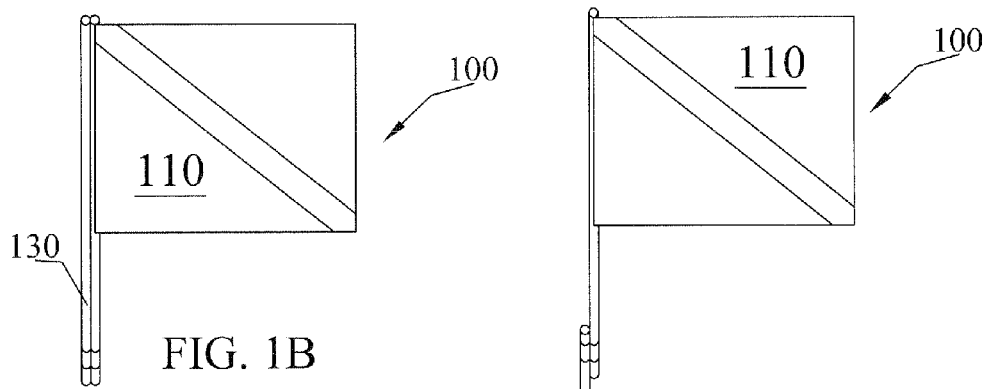
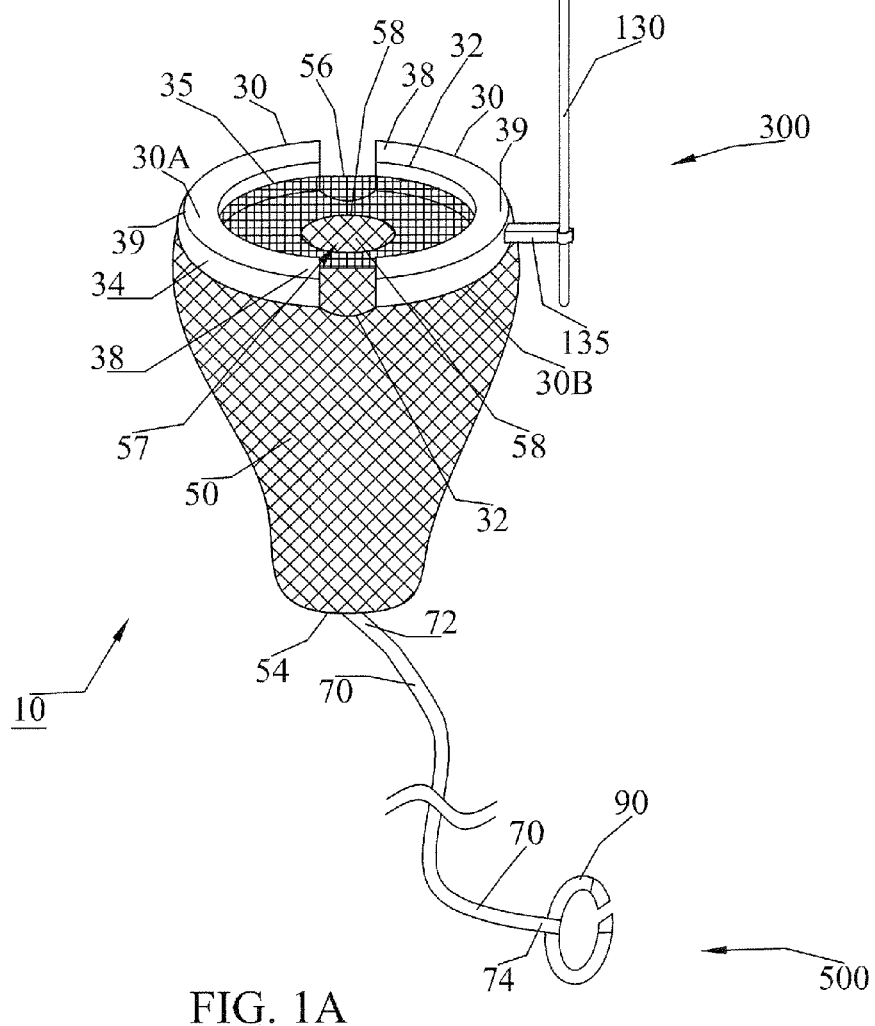
FIG. 1B
FIG. 1A

FLOATABLE COLLECTION RECEPTACLE

BACKGROUND OF INVENTION

There is a variety of bounty, both edible and non-edible, that can be harvested from the fresh and salt waters around the world. While commercial harvesting of some fish and crustacean species is a lucrative business, there is a large number of species that are only available to those individuals brave enough and willing to venture into such waters with the minimal gear. Often, state and federal regulations permit only "hand-harvesting" of various tasty sea creatures or collectable shells, coral, rocks, or other items. In many states and countries there are yearly seasons that allow individuals to harvest scallops, clams, oysters, abalone, mussels, lobsters, and other sea creatures.

Some things can be easily collected by wading in shallow waters. But, many are only found in deeper waters, sometimes in the bottom sediments or rocks. Typically, hand-harvesters use diving or snorkeling gear such as mask, snorkel, and swim fins to reach quarry within free-diving range. They also usually hold some sort of collecting container such as a bag or sack, for storing their catch. Unfortunately, having to hold the container with one hand makes it difficult to swim and collect. It also limits how much can be collected in the container, as too much weight or a large volume would be difficult to carry while swimming.

There is a need for a collecting container that can be kept within convenient proximity to a swimmer or wader, but does not necessarily have to be carried or maintained by hand. It could also be closable to prevent escape of live quarry. A compact or collapsible construction for easy transport and storage would also be advantageous.

BRIEF SUMMARY

The subject invention provides a collecting receptacle that successfully addresses the above described, and other, disadvantages associated with previously known devices and methods. In particular, the subject invention provides inexpensive, and highly effective methods and devices for convenient and effective underwater collection.

Generally, the embodiments disclosed herein include a collecting receptacle that floats, while remaining attached to a swimmer or diver. This can permit the swimmer or diver to utilize both hands for swimming and collecting. In other embodiments, the collecting receptacle is closable, to prevent escape of live collections and assist in transport. Also disclosed are embodiments that include the addition of various safety devices and swimmer identification or "diver down" devices.

BRIEF DESCRIPTION OF DRAWINGS

In order that a more precise understanding of the above recited invention be obtained, a more particular description of the invention briefly described above will be rendered by reference to specific embodiments thereof that are illustrated in the appended drawings. It should also be understood that the drawings presented herein may not be drawn to scale and that any reference to or indication of dimensions in the drawings or the following description are specific to the embodiments disclosed. Any variations of these dimensions that will allow the subject invention to function for its intended purpose are considered to be within the scope of the subject invention. Thus, understanding that these drawings depict only typical embodiments of the invention and are not therefore to be considered as limiting in scope, the invention will be described and explained with additional specificity and detail through the use of the accompanying drawings in which:

FIG. 1A is a perspective drawing of one embodiment of a collecting receptacle of the subject invention showing an attached safety locator device.

FIG. 1B illustrates one embodiment of a safety locator device that can be utilized with the embodiments of the subject invention.

DETAILED DISCLOSURE

Figure 2:
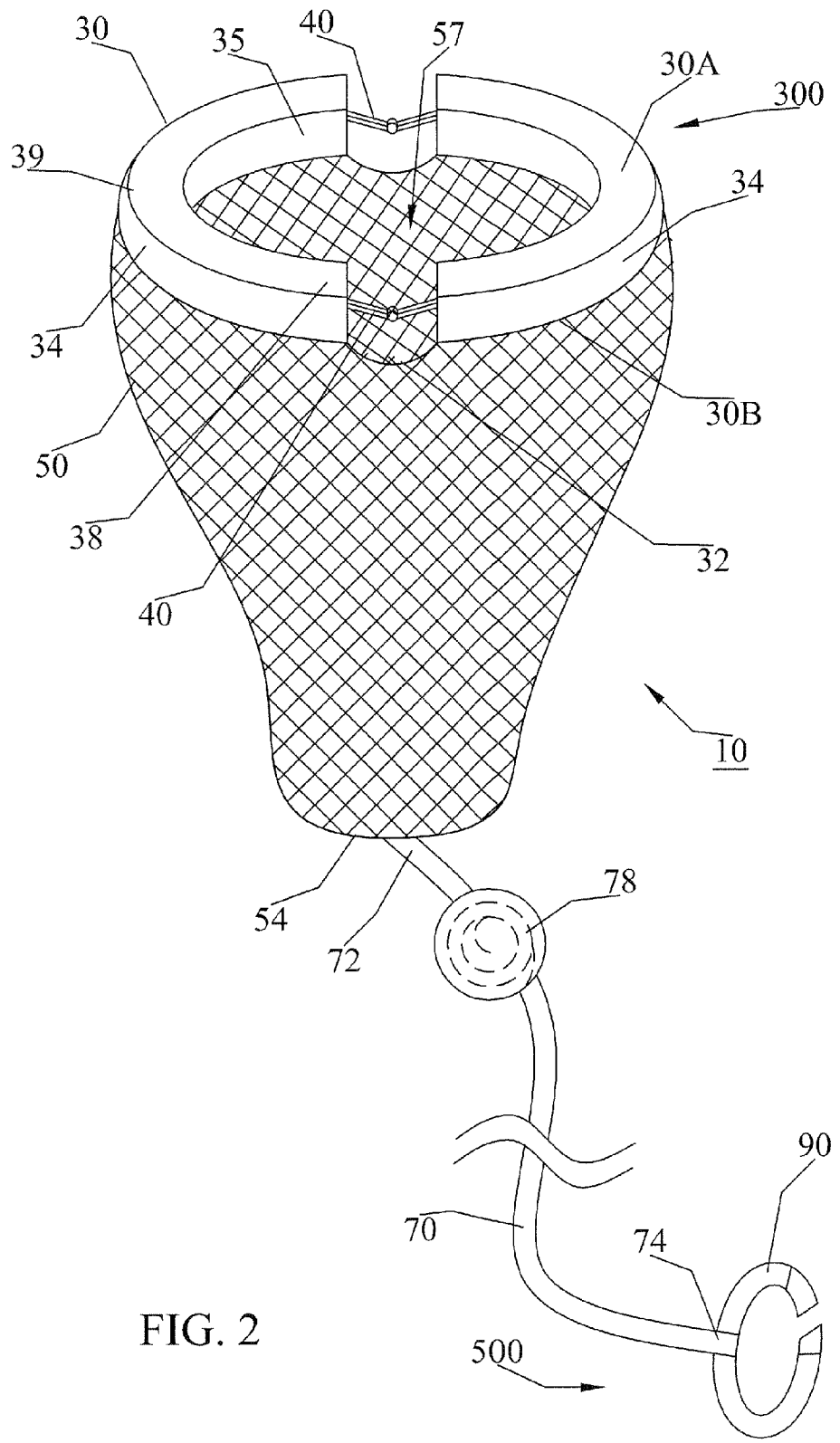
FIG. 2 is a perspective drawing of an alternative embodiment of a collecting receptacle of the subject invention showing a support rim having two foldable sections and a retractable and/or breakaway lanyard.

The subject invention in general describes embodiments of a floatable collecting receptacle. More specifically, the subject invention pertains to one or more embodiment(s) of a floatable c for collecting, or similar uses, that can be attached to a swimmer and that is capable of closing automatically, if submerged, to prevent escape or loss of collected items therein.

The following description will disclose that the subject invention is particularly useful in the field of aquatic operations or procedures, particularly collecting of live specimens. However, a person with skill in the art will be able to recognize numerous other uses that would be applicable to the devices and methods of the subject invention. Other modifications apparent to a person with skill in the art and having benefit of the subject disclosure are contemplated to be within the scope of the present invention.

In the description that follows, a number of terms related to aquatic harvesting or collecting are utilized. In order to provide a clear and consistent understanding of the specification and claims, including the scope to be given such terms, the following definitions are provided.

The terms "swimmer", "diver", "harvester" and "collector" as used herein, describes any person participating in the process of underwater searching and collecting. This can include a person walking or wading in shallow water or a person swimming in deeper water, with or without any swimming or diving gear.

As used herein, the terms "collectable", "item", "collected item" or variations thereof refer to anything obtained by a harvester. This can include living, or once living, species, such as, but not limited to, scallops, oysters, clams, fish, shells, corals, plants, fossils, or the like. It can also include any non-living item, such as, but not limited to, rocks, archeological-related items, or any other non-living item desired to be collected.

Also, as used herein, and unless otherwise specifically stated, the terms "operable communication", "operable attachment" and "operably connected", or the like, mean that the particular elements are connected in such a way that they cooperate to achieve their intended function or functions. The "connection" may be direct, or indirect, physical or remote.

In addition, references to "first", "second", and the like (e.g., first and second floats), as used herein, and unless otherwise specifically stated, are intended to identify a particular feature of which there are at least two. However, these references are not intended to confer any order in time, structural orientation, or sidedness (e.g., left or right) with respect to a particular feature.

Finally, reference is made throughout the application to the "proximal end" and "distal end." As used herein, the distal end is that end farthest from the harvester that typically floats at or above the water surface. Conversely, the proximal end of the device is that end nearest to a harvester.

It should also be understood that the singular for "a," "an" and "the", as used in the specification and in the claims, are meant to include plural referents unless the context clearly dictates otherwise.

The present invention is more particularly described in the following embodiments that are intended to be illustrative only since numerous modifications and variations therein will be apparent to those skilled in the art. With reference to the attached figures, which show certain embodiments of the subject invention, it can be seen that the subject invention provides a floatable collection receptacle 10 that includes, in general, a support rim 30 at the distal end 300, a container 50, a lanyard 70 and a securing device 90 at the proximal end 500. Optional embodiments can include one or more of various position indicators 100, such as, but not limited to, diver down flag, light emitter, marker buoys, noise emitters, and other position locators or safety devices.

The support rim 30 can provide a framework of, one or more parts, to which the container 50 and/or other items can be affixed. The support rim 30 can also float, so that it is capable of maintaining some portion of itself at, near, or above the surface of the water. In one embodiment, the support rim is an inflatable/deflatable flexible or semi-flexible balloon or balloon-like apparatus. In a further embodiment, the flexible balloon can be emptied of air or other buoyant substance and compressed so that it occupies a smaller space, advantageous for storage and transport.

In an alternative embodiment, the support rim is a rigid or semi-rigid hollow structure. In a further embodiment, the structure can be emptied of air and/or gas, but maintain, either entirely or partially, the original shape. In an alternative embodiment, the support rim can be filled with air and/or gas to enhance floatability.

In yet another alternative embodiment, the support rim can be a solid or semi-solid construction manufactured of any of a variety of floating or floatable materials, such as, but not limited to, various plastics, open-cell foams, closed-cell foams, polystyrene foam (Styrofoam™), wood, rubbers, fiberglass, and other suitable materials or various combinations thereof.

In a particular embodiment, the support rim is manufactured of a rigid foam that can resist water intrusion or absorption. In a more specific embodiment, the support rim is manufactured of a generally solid, rigid, closed-cell foam material. In an alternative particular embodiment, the support rim is manufactured of a flexible balloon. In a more specific alternative embodiment, the flexible balloon can be inflated for use and deflated for storage and transport.

There are a variety of materials or devices that can be utilized for a support rim of the subject invention. A person with skill in the art would be able to determine an appropriate material or structural apparatus for use as a support rim of the subject invention. Any and all such variations that are not inconsistent with the teachings herein are considered to be within the scope of the subject invention.

Figure 3:
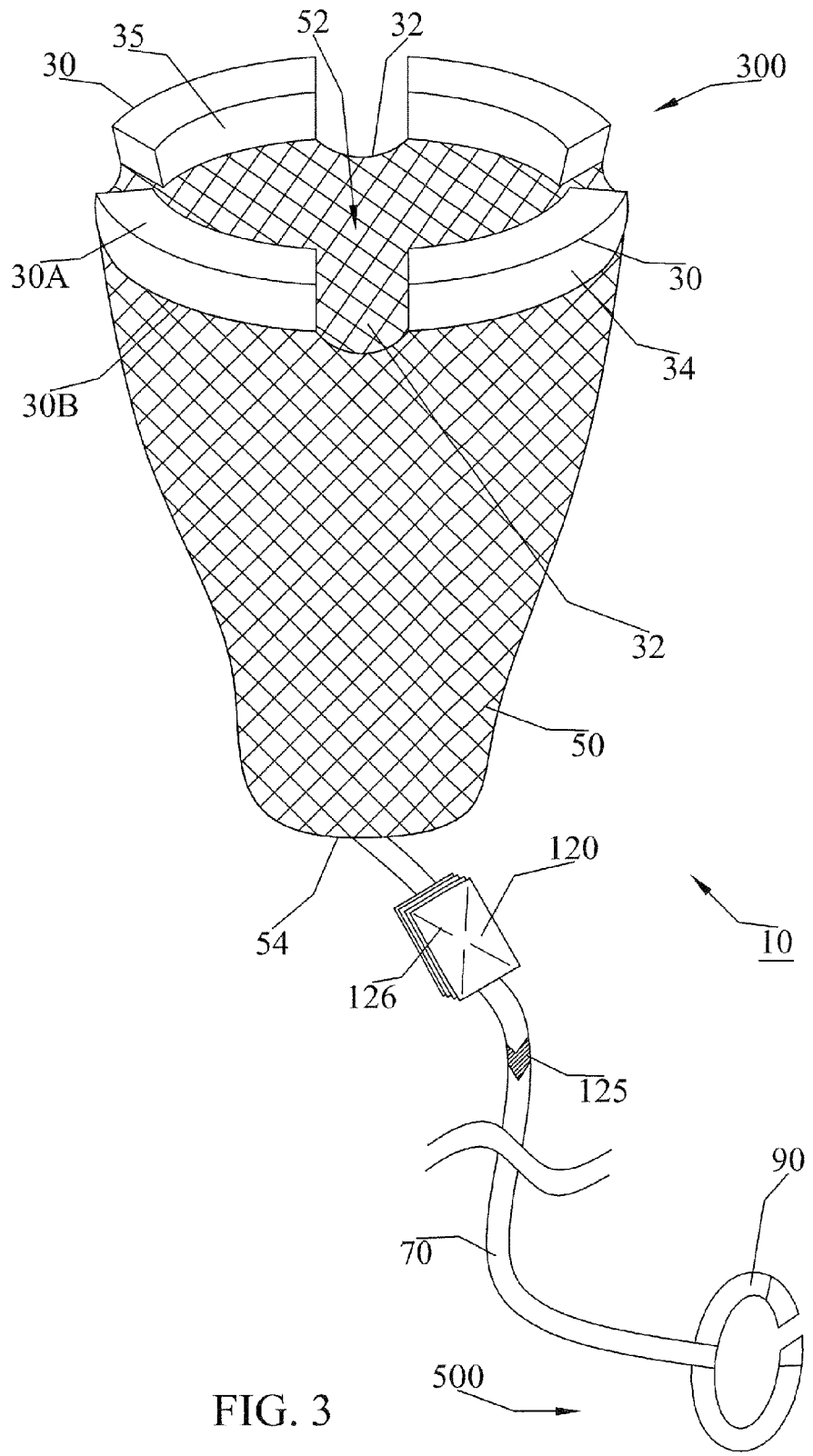
FIG. 3 is a perspective drawing of another alternative embodiment of a collecting receptacle of the subject invention showing a support rim having multiple closable sections and a lanyard having shock-arrest mechanism and a breakaway mechanism.

The general circumferential shape of the support rim 30 can vary depending upon any of a variety of factors known to those with skill in the art. For example, the shape of the support rim can be round, oval, square, rectangular, triangular, elongated, tubular, other polygonal shapes or combinations thereof. In a specific embodiment, the support rim has a generally toroidal or donut-like shape. In a more specific embodiment, the support rim has a generally toroidal shape with flattened or partially flattened upper surface 30A and lower surface 30B. As will be discussed below, a container 50 can be attached to the support rim 30. In a further embodiment, the support rim has a generally central or interior opening 32 there through to permit access to a container attached thereto or there around. FIGS. 1-3 illustrate examples of a support rim 30 having a generally toroidal shape that can have one or more flattened surfaces 30A and 30B and an interior opening 32. It should be understood that the exterior shape 34, exterior shape 35, the shape of the interior opening 32, or the shape of any other part of the support rim can vary. It is anticipated that any and all variations in the shape of the support rim that permit the floatable receptacle 10 to operate as herein, or similarly thereto, are within the scope of the subject invention.

Attached to the support rim, a container 50 typically hangs below or drifts underneath the support rim 30, usually below the surface of the water. This can be advantageous when collecting live specimens or collected items that are better kept submerged until they can be properly handled out of water. In one embodiment, the container is a rigid or semi-rigid enclosure. In an alternative embodiment, the container is a flexible, collapsible or otherwise non-rigid enclosure. The container can be enclosed, allowing little or no water flow into or out of the container. Alternatively, the container can have a plurality of openings to allow movement of water into and out of the container. The access opening to the container, or the mouth 52, can be in any location on the container that permits deposit of collectables. In one embodiment, one or mouths 52 are located on the side(s) of the container. Alternatively, the container can have a typical bag-like configuration, wherein the one or more mouths can be at one end of the container, generally opposite a bottom end 54. In a particular embodiment, the container is a fabric or fabric-like material. In a more specific embodiment, the container is a flexible, mesh material. In a still more specific embodiment, the container is a mesh-like material having a mouth at the distal end 300, such as seen, for example, in FIGS. 1, 2, and 3.

The shape of the container can vary depending upon a variety of factors including, but not limited to, materials utilized, the expected collectable item, environment for use, dimension of the container, and other factors known and understood by those with skill in the art. In one embodiment, the container has a squared or box-like shape. In an alternative embodiment, the bag has a somewhat cone-shaped configuration, wherein the bottom end 54 is significantly narrower than the mouth 52, an example of which is shown in FIG. 2. This can facilitate closing of the mouth and support rim, as will be discussed below.

The coupling of the container 50 and the support rim can be accomplished by any of one or more techniques and devices known to those with skill in the art. Such coupling can be permanent wherein the container and support rim are inseparable. In another embodiment, the coupling is removable, such that the support rim and container can be separated for storage, transport, repair, or any other necessity. In one embodiment, the mouth of the container is attached directly to the support rim. In an alternative embodiment, the mouth of the container extends over and/or around the support rim, such that it can be coupled back to itself, forming a sleeve-like enclosure around the support rim. In a still further embodiment, one or more straps, hooks, or other known devices are used to couple the container to the support rim. In a particular embodiment, multiple strips of hook and loop material are utilized to attach the container to the support rim. A person with skill in the art and having benefit of the subject disclosure would be able to devise any of a number of devices and techniques for permanently or removably coupling the container to the support rim. It is contemplated that any all such variations that are not inconsistent with the teachings herein are within the scope of the subject invention.

It can be helpful if a harvester, who may be swimming in less than calm water, can obtain access to the container mouth 52 to quickly and easily deposit collected items. For example, one usual procedure is to make multiple dives of short duration in between which the diver returns, collected items in hand, to the surface to breathe and deposit the collected items into the container. Thus, being able to deposit items without having to manipulate the opening on the container can be helpful.

In one embodiment, the mouth 52 of the container is maintained in an open position, allowing the diver to easily deposit items. In a further embodiment, the container 50 is constructed such that the mouth 52 is generally proximal to the bottom end 54, as illustrated, for example, in FIGS. 1-4. As mentioned previously, the shape of the support rim can be similar to, for example, a toroid or washer, that is, it has an interior opening 32. In this embodiment, the support rim 30 is affixed around the mouth 52 of the container 50, such that the mouth 52 is open and directed towards the surface of the water. This can allow a harvester to simply drop collected items into the receptacle, which will fall to the bottom end 54 of the container. When the support rim is coupled to the mouth of the container, there is formed a combined opening 57 in the floatable container 10.

It is typical for captured aquatic species to immediately seek refuge in deeper water when released. Thus, live specimens, even with an open mouth 52, will tend not to escape since they instinctively move towards the bottom end 54 of the container. However, it is possible that the collection receptacle 10 can be pulled beneath the surface, that wave action can cause temporary submersion of the support rim 30, or other factors can cause live specimens to be disturbed and/or activated to move towards the mouth opening. Birds or other wildlife may also attempt to steal live specimens. To better ensure that specimens do not escape, an escape barrier 56 can be secured around the opening 57. An escape barrier 56 can be any structure or apparatus that crosses all or part of the opening to prevent collected items, particularly live specimens, from jumping, flying, propelling, climbing, or in any other way escaping from the floating collection container 10.

In one embodiment, an escape barrier is a flexible material that extends across at least a portion of the opening 57, as shown, for example, in FIG. 1. An escape barrier can be permanently or removably attached. In a further embodiment, the escape barrier can have a drop hole 58 approximately centered in and/or angled towards the opening 57, such that when collectables are dropped into the interior opening, they are directed towards the drop hole and into the container.

In another embodiment, the escape barrier 56 is a net or mesh-like material that extends across at least a portion of the opening. In a more specific embodiment, the net or mesh material has openings that are sufficiently large enough that a diver can drop collected items through the opening and they will move quickly and easily through or past the mesh openings and into the container.

Figure 4:
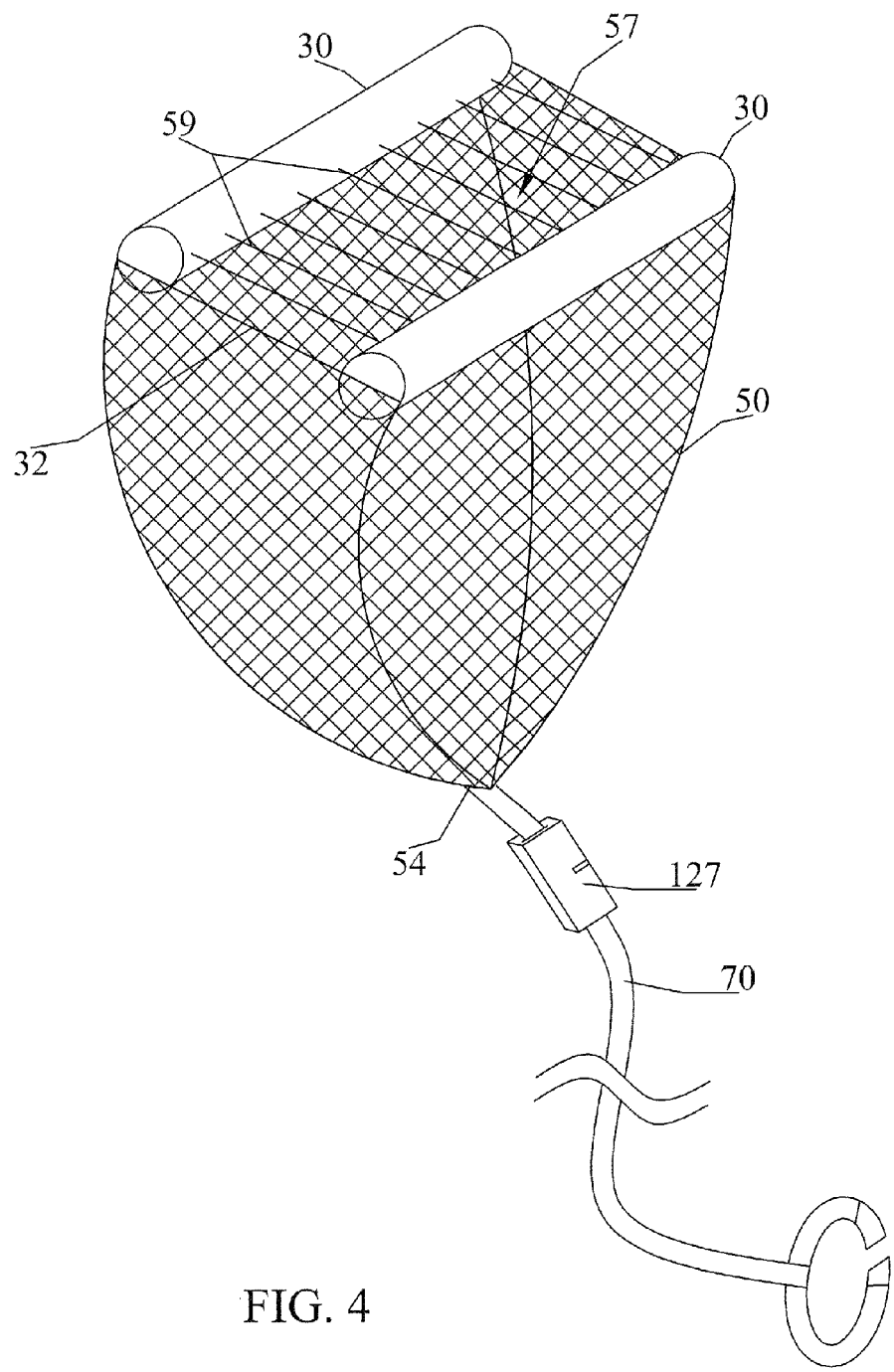
FIG. 4 is a perspective drawing of still another embodiment of a collecting receptacle of the subject invention showing an alternative embodiment of a support rim and a lanyard housing.

In a still further alternative embodiment, illustrated, for example, in FIG. 4, one or more crossing lines 59 can be extended across the opening. Crossing lines can be one or more separate lines having two ends attached to a different point, so that they cross over the opening 57 of the collecting receptacle 10. Crossing lines can be attached to the container, the support rim, or some other apparatus attached to the support rim or container. In one embodiment, crossing lines extend over the mouth in either the same plane or in one or more different planes, where some lines may be above or below other lines. In a further embodiment, crossing lines can extend in the same linear direction, that is they can be generally parallel or they can overlap at different angles to provide a criss-crossing pattern of separate lines, such as shown, for example in FIG. 3.

While is anticipated that the support rim 30 will float at or above the surface of the water most of the time, it is possible that it can become entirely or partially submerged. For example, a harvester may venture into water that is deeper than the length of the lanyard 70, which will be described below, causing the support rim 30 to be pulled downward, partially or entirely underwater. When this happens, any items or specimens in the receptacle 10 can be lost, such as when the upward force of the water causes the items to be pushed towards or out of the mouth 52 or through an escape barrier 56.

Figure 5:
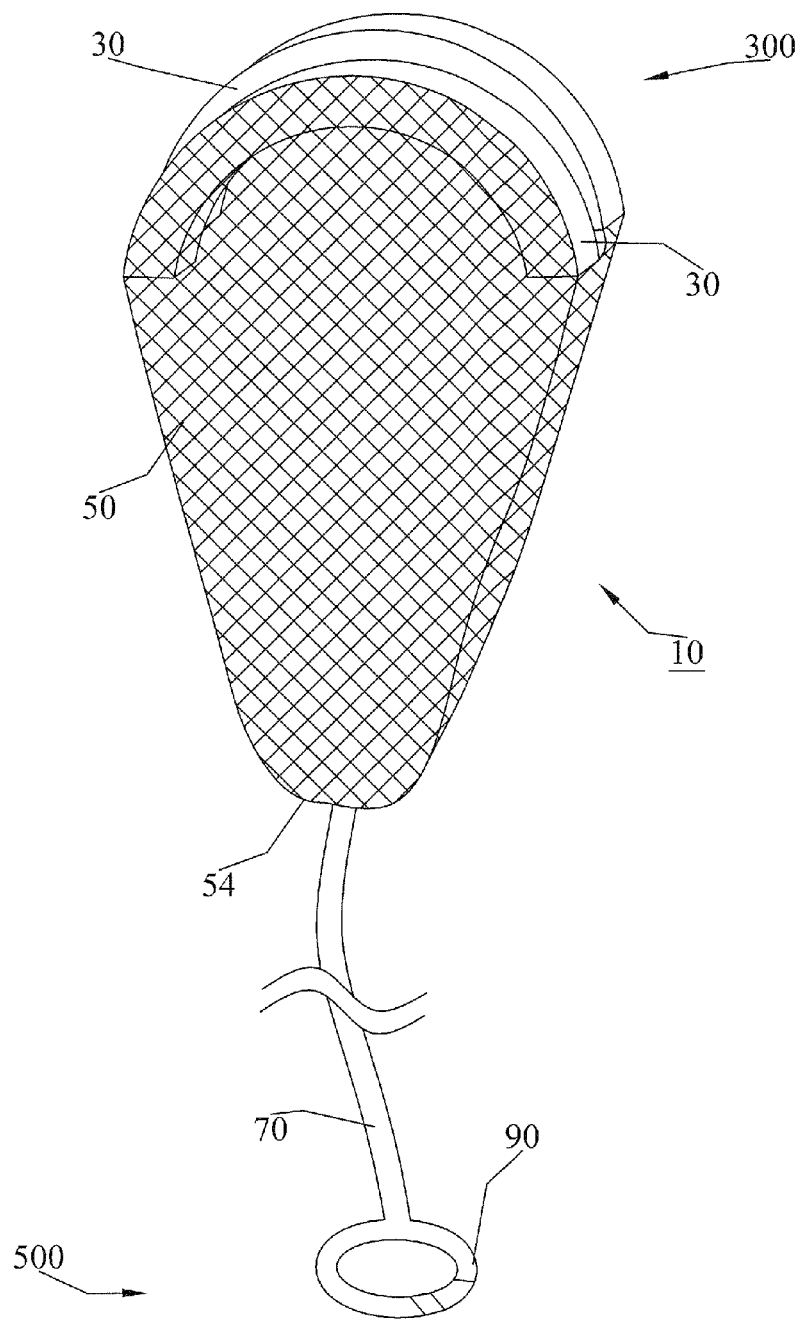
FIG. 5 is a perspective drawing of an embodiment demonstrating how the support rim can close when the collection receptacle is pulled beneath the water surface.

To reduce or prevent the loss of collected items when the collection receptacle 10 is taken below the surface of the water, the support rim can be made of one or more sections that can come together in some fashion to close or otherwise reduce the size of the. In one embodiment, the support rim is divided into one or more sections that, when submerged can fold upwards or turn vertically or otherwise come together to close over or otherwise reduce the size of the mouth of the receptacle. FIG. 5 illustrates an example of this embodiment. When the support rim rises back to the surface of the water, the sections can unfold or separate so that the mouth is again conveniently open. In one embodiment, shown in FIGS. 1 and 2 there is a divide between the sections that allows them sufficient space, so that they can be folded upwards or be drawn together to adequately close the mouth.

In one embodiment, the support rim is configured of multiple generally C-shaped sections. The C-shaped sections can be coupled to and/or around the mouth of the receptacle. In a particular embodiment, the support rim is configured of two generally C-shaped sections, such as shown, for example, in FIGS. 1 and 2. When the collection receptacle is on the surface, the C-shaped sections and their attachment to the mouth of the container cause them to tend towards spreading apart, allowing access to the opening 57, as shown in FIGS. 1 and 2. However, when the collection receptacle is pulled downward, especially by the force of the lanyard 70 pulling from the bottom end 54, the sections turn vertically with the arms 38 of the C-shaped sections pulled downward first, forcing the apex side 39 upwards, closing or at least making smaller the interior opening 32 and fully or at least partially closing the mouth 52, such as shown, for example, in FIG. 5 When the collection container again emerges onto the surface, the apex sides 39 emerge first and tend to fall apart as the legs follow upwards, forcing the mouth back into an open position.

In another embodiment, the support rim is configured of multiple sections that are coupled to and around the mouth of the container. The sections can be straight, curved or some combination thereof. When the collection receptacle is on the surface, the multiple sections can float independently and help to maintain the mouth in a generally open position. When the collection receptacle is submerged, particularly when pulled from the bottom end 54, the buoyancy of the multiple sections will cause them to gather together, drawing the mouth of the container closed. Again, when the support rim 30 emerges onto the surface again, the multiple sections can float apart, allowing access to the opening 57.

In a still further embodiment, the support rim is configured of multiple generally elongated sections. In a particular embodiment, the support rim is configured of two generally elongated sections. In a further embodiment, the elongated sections are interdigitated, such as, for example, two S-shapes or two I-shapes, such that the two sections can be situated side by side with little or no space in-between. The elongated sections are arranged so as to be basically parallel and on either side of the mouth. As above, when the collection receptacle is on the surface, the elongated sections can float independently and help to maintain the mouth in a generally open position. When the collection receptacle is submerged, particularly when pulled from the bottom end 54, the buoyancy of the elongated sections, as well as their interdigitated shapes will cause them to come together, drawing the mouth of the container closed. Again, when the support rim 30 emerges onto the surface again, the multiple sections can float apart, causing the mouth to remain generally open.

It can be important to ensure that the opening 57 of the container remains accessible for the deposit of collected items. A diver with full hands may not be able to separate or rearrange the support rim sections if they overlap or become entangled. Thus, when the support rim is submerged, the configuration of the different sections should be such that they maintain an opening when re-emerged onto the surface. To facilitate this, one or more biased elements 40 can be located between two or more sections. The biased elements, examples of which are shown in FIG. 2 can allow the sections to come together as designed when the support rim is submerged, but can also urge the sections to separate appropriately when they re-emerge onto the surface.

In one embodiment, a hinged apparatus or joint apparatus can be located between two or more sections of the support rim. In a further embodiment, the hinge or jointed can be spring-biased in a single direction, as shown, by way of example, in FIG. 2. In an alternative embodiment, one or more shape-memory materials or devices such as, for example, a spring, can be located between two or more sections of the support rim. The biased elements, be it a hinge, joint, shape memory material or other apparatus, can be biased so as to maintain the sections in a particular configuration when floating on the surface. When submerged, the buoyancy of the support rim and the force of the water can cause the usually floating sections to fold, interdigitate, or otherwise come together, such as described above, so as to close the opening 57. This, in turn, forces the biased hinge or joint to bend or compress and/or the shape-memory material or device to bend, fold or otherwise deform, for as long as the floating receptacle is submerged. When the sections re-emerge onto the water surface, the biased apparatus or shape-memory material forces the sections back into their original configuration.

It is usually good practice, and even a requirement in certain locales, that divers or swimmers employ a safety device (s) that indicate their location in the water. In most U.S. waters, divers and swimmers are required to display a "diver down" flag on a vessel or other floating marker. This indicates to other boaters that there is a diver somewhere within 300 feet of that vessel or floating marker. However, it can be difficult for a diver, swimmer, or other boaters to accurately judge whether they are within the 300 ft. safety zone. Surface marker buoys (SMBs) can be utilized that attach directly to the diver or swimmer and highlight their position as they move through the water.

In one embodiment, the floating collection receptacle 10 can also function as an SMB by the addition of one or more position indicator devices 100. In one embodiment, the support rim is rendered in a high-visibility color that makes it easier to see when floating on the water surface. In a further embodiment, a position indicator device 100 can be attached to the floatable receptacle. A position indicator device can be an apparatus fixedly or removeably attached to the floating collection receptacle. In one embodiment, the position indicator device is attached to the support rim. In another embodiment, the position indicator device can be positioned above the distal end 300 of the support rim 30. This can provide greater distance visibility to the position indicator device and also ensure that it does not interfere when depositing items into the container.

In a particular embodiment, an example of which is illustrated in FIG. 1, the position indicator device 100 is a diver down flag 110 attached to a rod or pole 130. It can be advantageous if the pole can be reduced in length when not in use to permit easier, and safer, transport and storage. In one embodiment, the pole can include two or more foldable or bendable members, an example of which is illustrated in FIGS. 1A and 1B. In an alternative embodiment, the pole can include two or more telescoping sections. The members can be unfolded or extended to provide a pole of sufficient length. In a still further alternative embodiment, all or part of the pole can be manufactured of a shape-memory material, such as plastic, rubber, metals, and other such materials, or shape-memory devices, such as springs, coils, specially shaped apparatuses, or similarly self-erecting sections. The rod can extend the flag, when attached, such that the top of the flag is between approximately 12 inches and approximately 5.0 ft above the distal end of the support rim. In a particular embodiment, the rod extends the flag such that the top of the flag is between approximately 2 ft and 3 ft above the distal end of the support rim.

In a further embodiment, the pole is attached so that it extends in a generally distal direction and from a side of the support rim. By not having the flag extending from the upper surface 30A of the support rim can prevent the pole from interfering with the closing of the opening 57 of the container when the support rim is submerged. In one embodiment, a pole support 133, such as, for example, a clamp, clip, sleeve, or other device can be affixed to the side of the receptacle 10 for holding or supporting and/or positioning the flag in a most visible orientation at the proximal end of the pole. In an alternative embodiment, the pole support 133 can be attached to an extender 135 that can be attached to the side of the support rim. The extender can ensure that the pole does not interfere with the closing of the opening during submersion. In a further embodiment, one or more rotatable, turnable, bendable, or otherwise movable or flexible devices, such as, for example, hinges, ball and socket devices, swivel devices, springs, shape-memory materials, similar device, or combinations thereof can be utilized with the pole support 133 and/or the extender 135. It should be understood that the attachment of the pole to the support rim can be accomplished by any of a multitude of techniques and devices known to those with skill in the art. It would be well within the skill of a person trained in the art, and having benefit of the subject disclosure, to create alternative methods and devices for attaching the flag pole to the support rim. It should be understood that any and all such variations are contemplated to be within the scope of the subject invention.

To attach the floating collection receptacle 10 to the diver or swimmer, a lanyard 70 can be attached by a first end 72 to the bottom end 54 of the container 50 and the second end 74 can be attached directly to the diver. In a particular embodiment, the second end is attached to a securing device 90 that can be releasably attached to the diver. In a specific embodiment, the securing device employs hook and loop material. It should be understood that the subject invention is not limited to any specific method or device for attachment to the diver. Alternative methods and devices than those presented here are contemplated to be within the scope of the subject invention.

As the diver searches for collectable items, the lanyard 70 permits the floatable collection receptacle 10 follow or drift with the diver as it floats on the surface of the water. Changes in the diver's depth caused by the underwater topography, tides, wave action, currents, and other factors can dictate the length of the lanyard necessary to attach the floatable collection receptacle 10 to the diver, so that it can still reach the surface. Therefore, it can be beneficial for the lanyard to be adjustable in length.

In one embodiment, the lanyard 70 has a length that can be adjusted as desired by the diver. This can permit the diver to manually control how long the lanyard should be for the existing conditions. There are several methods and devices known in the art that would permit a diver to determine and secure an appropriate tether length. In one embodiment, the length of the lanyard can be adjusted by folding or gathering any unnecessary portion and securing it together to maintain the desired length. When additional length is needed, one or more folds or other gathered portion can be released and the remaining unrequired length can be re-secured. In one embodiment a tether, such as, for example, a tie, wrap-around stay, hook and loop band, elastic band, or devices similar can be used to secure a length of the lanyard. In a particular embodiment, the tether is attached to the lanyard 70, for convenience. Any unnecessary length of the lanyard can be folded, wound-up, gathered or otherwise shortened and the tether secured around it to maintain the desired length.

In another embodiment, a hard or soft case that can be opened and closed, by any of a variety of means known in the art, is attached to the lanyard. When desired or necessary, a sufficient length of the lanyard can be gathered into the open container. Closing the container secures the gathered lanyard portion therein, and maintains the remaining ungathered lanyard at the desired length.

To harvest some collectable items, a diver can be required to make relatively deep dives. While the support rim can be designed to close when submerged, as described above, the force of constant submersion can be undesirable for certain collected items. It can also be tiring to the diver to continually exert sufficient force to overcome the buoyancy of the support rim to make sufficiently deep dives. To prevent this, the lanyard can be designed with sufficient length, so that the harvester can reach a desired depth. But, in some situations, a lanyard length adequate for deeper dives can be inconvenient when returning to the surface or unsafe. Therefore, it can be desirable for the lanyard to be used with a mechanism that can automatically or semi-automatically wind, roll, fold, retract, gather, or otherwise control lanyard length as necessary. It can also be desirable for the mechanism to be able to release the lanyard to increase length as necessary. In a more particular embodiment, it can be desirable for the lanyard to be used with a mechanism that can react to forces on the lanyard to control the length of the lanyard appropriately.

In one embodiment, the lanyard is operatively connected to a spring-loaded retracting mechanism 78. Spring-loaded retracting mechanisms are known in the art and have been commonly used with such items as, for example, clotheslines, measuring tapes, dog leashes, and similarly retractable items. They can employ some type of spring or other shape-memory material or item operably connected to a bobbin, spool, or other structure around which can be wound any of a variety of elongated, flexible, or at least bendable, tapes, ropes, strings, bands, or similar devices, such as, in the embodiments disclosed herein, a lanyard 70. However, other types of retractable mechanisms are known and could be used with embodiments of the subject invention. Typically, when sufficient force is applied, the two ends of the lanyard are pulled apart the necessary, or available, length. When the force is reduced or eliminated, the two ends are brought closer together and the retracting mechanism operates to shorten the lanyard, drawing the receptacle and the diver closer together.

In one embodiment, a first end of the lanyard 72 is attached to the bottom end 54 of the container 50 and the second, opposite end is operably connected to the retracting mechanism, which is removably coupled to the diver. A force exerted between the buoyancy of the support rim 30 attached to the container and the diver can be sufficient to deploy the lanyard. In a more specific embodiment, the retracting mechanism allows the length of the lanyard to be adjustable, so that the length varies as necessary. In a further embodiment, the retracting mechanism includes a lock that can be engaged to maintain the lanyard at any desired length until the lock is disengaged.

In another embodiment, the lanyard employs an elastic or coiled material along some or all of its length. When force is applied between two ends, the lanyard or some portion thereof can stretch or uncoil to the desired length. When the force is reduced or eliminated, the elastic material causes the lanyard to automatically retract or recoil to the original length. It should be understood that numerous alternatives for controlling the length of the lanyard would be known and/or apparent to a person with skill in the art. Such alternatives are contemplated to be within the scope of the embodiments disclosed herein.

Unfortunately, there can be hazards associated with any diving or swimming activity, especially in open water. Moving boats and/or objects in the water are always a concern. There are also dangerous animals and fish in the water can be attracted to harvested items, such as fish or shellfish, within the floatable collection receptacle 10. In the event that a boat or other moving object does not see the safety devices 100 and/or the floatable receptacle, it can become entangled in the lanyard or around the floatable collecting receptacle. It is also not implausible that a shark or other fish, sea mammals, and other creatures would try to swim away with the contents of the container. In such events, the diver, perhaps unaware of or incapable of avoiding the approaching danger, can be caught and dragged through the water, until they are able to release the securing device 90 that attaches them to the receptacle. However, if the diver is unable for some reason to release the securing device, they could be dragged through the water, causing injury or moving them dangerously far from their exit point. To avoid or reduce such dangers, embodiments of the subject invention can employ a self-releasing lanyard. More specifically, embodiments of the subject invention employ one or more break-away and/or "shock-arrest" mechanisms 120.

Shock-arrest mechanisms are known in the art and are often utilized with lanyards worn by individuals working at dangerous heights. They are utilized as a safety device typically used to ensure that a person stays attached to another object. Typical designs protect the person from falls or other impact and subsequent bodily injury by deploying when sufficient stress is applied to the lanyard. Some safety lanyards include stretchable or elastic material (a.k.a., "bungee cord") that can expand beyond a predetermined length when sufficient stress is applied. Others include single- or multi-stage shock absorbing breakable stitching or multiple, attached folds, pleats, loops or similar structures that release under sufficient stress to allow the lanyard to lengthen in stages and thereby reduce the overall G-forces on the body during a fall. The material utilized for the shock arrest mechanism can be the same or different from that of the lanyard. Retractable coils or springs, and other stress-activated, lanyard-extending or lanyard-altering methods are also known and used by those with skill in the art.

In one embodiment, the lanyard 70 is configured with a shock-arrest mechanism 120 that lengthens the lanyard when sufficient force is applied to one or both ends of the lanyard. Utilizing one or more shock-arrest mechanisms with the lanyard can prevent sudden jolting or forceful jerking from being exerted on the body if the lanyard or collecting receptacle is caught by a fast moving surface vehicle, animal or other moving object. The shock-arrest mechanism when activated by sufficient force on the lanyard can separate gradually so that sudden force on the body is reduced.

In an alternative embodiment, breakaway stitching 126 is utilized with the shock-arrest mechanism. In this embodiment, when sufficient force is applied to the lanyard, the stitching breaks apart to gradually allow the lanyard to lengthen reducing the effects of a sudden force or jolt to the body.

In yet another alternative embodiment, hook and loop material is utilized with the shock arrest mechanism, such that application of sufficient force separates sections of the hook and loop material allowing the lanyard to lengthen. Advantageously, this embodiment allows the shock arrest mechanism to be re-set or re-assembled by reattaching the hook and loop sections of material. In a specific embodiment, the shock-arrest mechanism utilizes a combination of both the multiple folds or pleats incorporated into the lanyard with breakaway stitching and/or hook and loop material that allows the shock arrest mechanism to gradually length the lanyard when sufficient stress is applied.

In still another alternative embodiment, the material of the shock arrest mechanism is held within a housing 127, such as, for example, a sleeve, case, housing, replaceable packaging, or similar devices, that permit that shock arrest mechanism to be re-packed, if necessary, for future use. FIG. 4 illustrates an example of this embodiment. With this option, the shock arrest mechanism can be partially or entirely deployed, to protect the diver multiple times. It should be understood that a person with skill in the art, having benefit of the subject application, would be able to devise any of a variety of alternative shock-arrest mechanisms that could be utilized effectively with embodiments of the subject invention. It is contemplated that such alternatives are within the scope of the subject invention and the herein appended claims.

Some types of shock-arrest mechanisms include one or more separation points or break-away mechanisms 125 or similar devices or techniques that automatically disconnect or separate at a pre-determined point on the lanyard to release a person from their attachment to the other object, if sufficient force is applied to the lanyard. In these types of safety devices, a first force level can be necessary to activate the shock-arrest mechanism and a second force or continued exertion of force is necessary to activate the break-away mechanism. The first and second forces can be approximately equivalent or they can be significantly different. By way of non-limiting example, the first force necessary to activate the shock-arrest mechanism could be less than that necessary to activate the break-away mechanism. One advantage to this arrangement is that it can afford the diver an opportunity to disengage the lanyard and/or collection receptacle from whatever it may be entangled with, e.g., coral, oysters, plants, or other harmless objects in the water. However, in the event that the diver is unable (or unwilling!) to try and disengage from whatever has ensnared them, the break-away mechanism can be employed to disconnect the diver from the object.

The amount of force necessary to activate a shock-arrest mechanism and/or a break-away mechanism can have great variability, since it can depend upon the intended use. For the purposes of the embodiments of the subject invention, the amount of force necessary to activate the shock-arrest mechanism and/or the breakaway mechanism should be the minimum necessary to separate the lanyard before the person is dragged or pulled a dangerous distance and/or more than a few feet in the water. The goal of this or a similar arrangement being to prevent a person in the water from being injured by the force of being dragged, possibly at high speed and/or over dangerous underwater terrain. By automatically separating the lanyard, they can be released from whatever (surface vessel, animal, etc.) has become attached to or entangled with the lanyard.

There may also arise situations in which the person is being dragged, but not necessarily at a dangerous speed. For example, a large aquatic predator that may have taken a liking to the contents of the collection receptacle may cruise at relatively slow speeds, or a surface vessel under low power could continue on at a slow speed, both unaware that they are dragging a person along behind them. In such situations, the diver may need to deliberately exert sufficient force to break the lanyard and, thus, their connection to whatever has become ensnared with their collection receptacle and/or lanyard. Thus, the amount of force necessary to break the lanyard should be the minimum necessary that a diver can exert to break the lanyard. This could be variable depending upon the strength of the diver. In one embodiment, lanyards could be configured with break-away mechanisms that operate with different force requirements. By way of non-limited examples, a smaller or younger diver may opt for a lanyard that breaks with an exerted force of approximately 5 lbs, whereas a larger, stronger diver can utilize a lanyard that breaks with an exerted force of approximately 50 lbs. This can allow the diver the option of detaching the lanyard from an object, if possible, without losing the contents of their collection receptacle, but affords the safety being able to totally disconnect from the receptacle and/or the lanyard if it becomes dangerously ensnared. In one embodiment, the lanyard is configured with a breakaway mechanism that detaches with an exerted force of between approximately 5 lbs. to approximately 100 lbs. In more specific embodiment, the lanyard is configured with a breakaway mechanism that detaches with an exerted force of between approximately 10 lbs. and approximately 70 lbs. In a particular embodiment, the lanyard is configured with a breakaway mechanism that detaches with an exerted force of between approximately 15 lbs. and approximately 50 lbs. However, it should be understood that the breakaway mechanism utilized with embodiments of the subject invention can be configured to be detachable with any desirable amount of exerted force, and, as mentioned above, the force to be exerted can be variable to accommodate for any of a variety of environments, uses, divers, collected materials, and other factors that would be known and appreciated by those with skill in the art. Such variations are contemplated to be within the scope of the embodiments of the subject invention.

There are any of a variety of breakaway-mechanisms 125 known to those with skill in the art, including, by way of example, buckles, clasps, connectors, which are designed with break-apart or separable configurations. Other types of break-away mechanisms can include heat or cold pressed attachments, or limited-stretch materials, such as, for example, plastic, rubbers, nylons, metals, other materials or composites or combinations thereof, that are used as "weak zones", designed to break apart or otherwise separate when appropriate force is applied. An example of this would be a section of plastic, rubber or nylon material incorporated into the lanyard that can stretch a short distance before breaking apart. Other examples of weak zones that can be incorporated into the lanyard and/or into a shock-arrest mechanism, which are designed to break, rip, snap, pull apart, or otherwise separate when sufficient stress is applied, such as, for example perforated or scored materials, hook and loop material, magnetic attachments, or even materials that dissolve or weaken on contact with water. A person with skill in the art, having benefit of the subject disclosure, would be able to determine any of a variety of break-away mechanisms that could be utilized with the various embodiments of the subject invention. It is contemplated that any and all such variations that are not inconsistent with the teachings herein are within the scope of the subject application and claims.

In one embodiment, the lanyard is configured with at least one shock arrest mechanism. In a particular embodiment, the shock arrest mechanism utilizes multiple folds or pleats that separate under sufficient force to lengthen the lanyard. In a further particular embodiment, the shock arrest mechanism is formed from the same material used for the lanyard. In an alternative embodiment, the shock arrest mechanism is formed from a different material than the lanyard. In a further alternative embodiment, the shock arrest mechanism is formed of a material that minimizes the overall weight and/or size of the shock arrest mechanism, to reduce the burden on the diver as much as possible. In a further embodiment, the shock arrest mechanism is maintained in a re-packable housing, such that the shock arrest mechanism can be deployed (such as during a harmless entanglement) and re-packed multiple times.

In a further embodiment, a break-away mechanism is employed in conjunction with a shock arrest mechanism on the lanyard. This can ensure that if the shock arrest mechanism is fully deployed to its maximum length and sufficient force is still applied continually or intermittently to the lanyard, the diver will be disconnected from the collection receptacle 10 and at least some portion of the lanyard attached thereto. In a particular embodiment, the break-away mechanism is incorporated into the material of the shock arrest mechanism. This can allow the break-away mechanism to also be maintained in the housing 127. In a further particular embodiment, the break-away mechanism can be located on the shock arrest mechanism in such a position that it will be activated only after the shock arrest mechanism is fully deployed to its maximum length, if force is still being continually or intermittently applied to the lanyard. In a still further particular embodiment, the amount of force necessary to activate the break away mechanism is less than that necessary to deploy the shock arrest mechanism. Alternatively, the amount of force necessary to activate the break away mechanism can be greater than that necessary to deploy the shock arrest mechanism. This can ensure that the break away mechanism is activated only when absolutely necessary.

In an alternative embodiment, the break away mechanism can be incorporated into the lanyard, separate from or as an alternative to a shock arrest mechanism. With this embodiment, the break away mechanism can be maintained outside of the housing used for the shock arrest mechanism. Further, the force necessary to activate the break away mechanism can be greater than that necessary to activate the shock arrest mechanism, to ensure that the lanyard is not separated before the shock arrest mechanism has an opportunity to operate first.

The popularity of swimming and diving for collecting artifacts, shells, sea creatures, and food items is increasing every year. With so many people in the water, there are more opportunities for divers to encounter boaters, marine life, and other objects that have the potential to be very dangerous. The embodiments of the subject invention provide a device that makes collecting easier and more efficient, and that includes several safety features to protect the diver.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

It should be understood that any reference in this specification to "one embodiment," "an embodiment," "example embodiment," "further embodiment," "alternative embodiment," etc., is for literary convenience. The implication is that any particular feature, structure, or characteristic described in connection with such an embodiment is included in at least one embodiment of the invention. The appearance of such phrases in various places in the specification does not necessarily refer to the same embodiment. Further, when a particular feature, structure, or characteristic is described in connection with any embodiment, it is submitted that it is within the purview of one skilled in the art to affect such feature, structure, or characteristic in connection with other ones of the embodiments.

The invention has been described herein in considerable detail, in order to comply with the Patent Statutes and to provide those skilled in the art with information needed to apply the novel principles, and to construct and use such specialized components as are required. However, it is to be understood that the invention can be carried out by specifically different equipment and devices, and that various modifications, both as to equipment details and operating procedures can be effected without departing from the scope of the invention itself. Further, it should be understood that, although the present invention has been described with reference to specific details of certain embodiments thereof, it is not intended that such details should be regarded as limitations upon the scope of the invention except as and to the extent that they are included in the accompanying claims.

We claim:

1. A floatable collection receptacle comprising:
a support rim having two or more floatable sections forming an interior opening;

a container having a mouth and a bottom end, wherein the container is operably connected to the support rim, such that the mouth is contiguous with the interior opening of the support rim;

a lanyard having a distal end and a proximal end, wherein the distal end is operably connected at or about the bottom end of the container;

further comprising an escape barrier with a drop hole over the interior opening of the support rim where the escape barrier is directed towards the mouth of the container and directs objects towards the drop hole; and wherein the two or more floatable sections remain in an apart position until a force exerted by the lanyard at least partially submerges the support rim whereby the two or more floatable sections automatically come together and cause the mouth of the container to close or be reduced in size.

2. The floatable collection receptacle, according to claim 1, wherein the two or more floatable sections are generally C-shaped.

3. The floatable collection receptacle, according to claim 1, further comprising a securing device at the proximal end of the lanyard.

4. The floatable collection receptacle, according to claim 3, wherein the lanyard has an adjustable length.

5. The floatable collection receptacle, according to claim 1, wherein the support rim comprises sections of inflatable balloon apparatuses.

6. The floatable collection receptacle, according to claim 1, wherein the support rim comprises a foam material.

7. The floatable collection receptacle, according to claim 1, wherein the container comprises a plurality of openings to allow water flow.

8. The floatable collection receptacle, according to claim 7, wherein the container is a rigid or semi-rigid enclosure.

9. The floatable collection receptacle, according to claim 7, wherein the container is a flexible enclosure.

10. The floatable collection receptacle, according to claim 7, wherein the container and the support rim are inseparable.

11. The floatable collection receptacle, according to claim 7, wherein the container and the support rim can be separated.

12. The floatable collection receptacle, according to claim 10, wherein the escape barrier comprises a flexible material with a plurality of openings to allow water flow.

13. The floatable collection receptacle, according to claim 10, wherein the escape barrier comprises a plurality of crossing lines.

14. The floatable collection receptacle, according to claim 12, further comprising a surface marker bouy removably attached to the support rim.

15. The floatable collection receptacle, according to claim 14, further comprising a pole support.

\* \* \* \* \*